US011508035B2

United States Patent
Yu et al.

(10) Patent No.: US 11,508,035 B2
(45) Date of Patent: Nov. 22, 2022

(54) IMAGE RETARGETING METHOD AND DEVICE

(71) Applicant: Samsung Electronics Co., Ltd., Suwon-si (KR)

(72) Inventors: Jiang Yu, Nanjing (CN); Youxin Chen, Nanjing (CN); Longhai Wu, Nanjing (CN); Jie Chen, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/333,900

(22) Filed: May 28, 2021

(65) Prior Publication Data

US 2022/0207653 A1  Jun. 30, 2022

(30) Foreign Application Priority Data

Dec. 29, 2020 (CN) .......................... 202011587831.5

(51) Int. Cl.
*G06T 5/00* (2006.01)
*G06T 3/40* (2006.01)
*G06V 40/10* (2022.01)
*G06V 40/16* (2022.01)

(52) U.S. Cl.
CPC .............. *G06T 3/4092* (2013.01); *G06T 5/00* (2013.01); *G06V 40/10* (2022.01); *G06V 40/161* (2022.01)

(58) Field of Classification Search
CPC ......... G06T 3/4092; G06T 5/00; G06V 40/10; G06V 40/161
USPC ....................................................... 345/428
See application file for complete search history.

(56) References Cited

U.S. PATENT DOCUMENTS

| 8,531,535 B2 | 9/2013 | Kwatra et al. |
| 8,718,333 B2 | 5/2014 | Wolf et al. |
| 10,120,659 B2 | 11/2018 | Cathey et al. |
| 2007/0079236 A1 | 4/2007 | Schrier et al. |
| 2009/0251594 A1* | 10/2009 | Hua .................. H04N 21/2662 348/E7.003 |

(Continued)

FOREIGN PATENT DOCUMENTS

| EP | 2 975 574 B1 | 3/2020 |
| JP | 2012-168615 A | 9/2012 |
| KR | 10-0388840 B1 | 6/2003 |

OTHER PUBLICATIONS

Z. Liu, H. Yan, L. Shen, K.N. Ngan, Z. Zhang, Adaptive image retargeting using saliency-based continuous seam carving, Opt. Eng. 49 (2010) 1-10.*

(Continued)

*Primary Examiner* — Jin Ge
(74) *Attorney, Agent, or Firm* — Jefferson IP Law, LLP

(57) ABSTRACT

A method for controlling an electronic device is provided. The method includes obtaining an intermediate image by preprocessing an original image, obtaining a saliency feature map of the intermediate image by performing semantic saliency analysis on the intermediate image, performing adaptability calculation according to the saliency feature map and a retargeted target equipment condition, and determining a retargeting mode of the original image according to the result of the adaptability calculation, and performing retargeting processing on the original image according to the determined mode.

14 Claims, 10 Drawing Sheets

(56) References Cited

U.S. PATENT DOCUMENTS

| | | | | |
|---|---|---|---|---|
| 2010/0124371 | A1* | 5/2010 | Jiang | G06V 10/462 382/162 |
| 2010/0232729 | A1* | 9/2010 | Peleg | G06T 11/60 382/298 |
| 2011/0182502 | A1* | 7/2011 | Liang | G06T 1/00 382/162 |
| 2012/0099794 | A1 | 4/2012 | Peeters et al. | |
| 2012/0121204 | A1* | 5/2012 | Ding | G06T 3/0012 382/260 |
| 2013/0031467 | A1 | 1/2013 | Zylik | |
| 2013/0084013 | A1* | 4/2013 | Tang | G06V 10/462 382/195 |
| 2013/0342758 | A1* | 12/2013 | Greisen | G06T 3/0012 348/E7.003 |
| 2015/0117783 | A1* | 4/2015 | Lin | G06T 7/11 382/195 |
| 2016/0275067 | A1* | 9/2016 | Mei | G06F 40/106 |
| 2017/0337896 | A1* | 11/2017 | Nicolas | G06T 3/0012 |
| 2020/0210766 | A1 | 7/2020 | Lim et al. | |

OTHER PUBLICATIONS

V. Setlur, S. Takagi, R. Raskar, M. Gleicher, and B. Gooch, "Automatic image retargeting," in Proc. ACM Int. Conf. on Computer Graphics and Interactive Techniques, pp. 59-68, 2005.*

V. Setlur, T. Lechner, M. Nienhaus, and B. Gooch, "Retargeting images and video for preserving information saliency," IEEE Comput. Graphics Appl. 27(5), 80-88 2007.*

Tanchao Zhu et al., "Saliency-based Adaptive Scaling for Image Retargeting", 2011 Seventh International Conference on Computational Intelligence and Security, IEEE, pp. 1201-1205, Dec. 2011.

International Search Report and Written Opinion dated Sep. 17, 2021, issued in International Patent Application No. PCT/KR2021/006667.

* cited by examiner

IMAGE RETARGETING METHOD AND DEVICE

CROSS-REFERENCE TO RELATED APPLICATION(S)

This application is based on and claims priority under 35 U.S.C. § 119(a) of a Chinese patent application number 202011587831.5, filed on Dec. 29, 2020, in the Chinese Patent Office, the disclosure of which is incorporated by reference herein in its entirety.

BACKGROUND

1. Field

The disclosure relates to image processing technologies. More particularly, the disclosure relates to an image retargeting method and device.

2. Description of Related Art

As video players diversify, the need to display images at different resolutions and equipment width-to-height ratios continues to increase. The process of adapting an original picture for display at different resolutions and equipment width-to-height ratios is referred to as image retargeting.

At present, some achievements have been made in the research of image retargeting. Traditional methods include Scale (SCL) and Crop (CR). SCL scales an image to a given resolution, which is fast, but often results in distortion. CR is an effective method to extract important parts of the original image, but if an image contains many separate objects, it will not maintain enough semantic information. It can be seen therefrom that conventional image retargeting methods rely on low-level features to predict the importance of pixel levels while allowing warping of less important regions. The corresponding method has a good effect on images with clear target and monotonous background, but their effect and performance cannot be guaranteed for pictures with complex structure.

Seam carving (SC) is also a very classic image retargeting method, which adjusts the image size by repeating the following operations of: calculating the energy of each pixel in the image and then removing or inserting a "seam" containing the smallest energy. SC can prevent distortion to some extent, but SC can produce severe distortion when a significant portion of the key subject is significantly affected. In addition, on some terminal equipment, the SC is time consuming.

As can be seen from the above, in the existing image retargeting method, the following conditions are often encountered:

(1) image display adapted image distortion or severe distortion.

(2) the processing time for display adaptation on the equipment is too long to complete batch picture processing within a specified time.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an image retargeting method and device, which can retarget the resolution ratio and the width-to-height ratio of an image to a target under the condition of keeping a key target and a small amount of distortion, thereby improving user experience.

Additional aspects will be set forth in part in the description which follows and, in part, will be apparent from the description, or may be learned by practice of the presented embodiments.

In accordance with an aspect of the disclosure, a method for controlling an electronic device is provided. The method includes obtaining an intermediate image by preprocessing an original image, obtaining a saliency feature map of the intermediate image by performing semantic saliency analysis on the intermediate image, performing adaptability calculation according to the saliency feature map and a retargeted target equipment condition, and determining a retargeting mode of the original image according to the result of the adaptability calculation, and performing retargeting processing on the original image according to the determined mode.

In accordance with another aspect of the disclosure, an electronic device is provided. The electronic device includes a memory, and a processor comprising a preprocessing unit, a semantic saliency analysis unit, an adaptability calculation unit and a retargeting unit, wherein the processor configured to obtain, through the preprocessing unit, an intermediate image by preprocessing an original image, obtain, through the semantic saliency analysis unit, a saliency feature map of the intermediate image by performing semantic saliency analysis on the intermediate image, perform, through the adaptability calculation unit, adaptability calculation according to the saliency feature map and the retargeted target equipment condition, and determine, through the retargeting unit, a retargeting mode of the original image according to the result of the adaptability calculation, and perform retargeting processing on the original image according to the determined mode.

According to the technical scheme, the original image is preprocessed to obtain an intermediate image, semantic saliency analysis is performed on the intermediate image to obtain a saliency feature map of the intermediate image, adaptability calculation is performed according to the saliency feature map and the retargeted target equipment condition, and a retargeting mode of the image is determined according to the result of the adaptability calculation, and retargeting processing is performed on the original image according to the determined mode. In the processing, the adaptability calculation is performed according to the semantic saliency analysis result of the image, and an appropriate retargeting mode is selected to perform retargeting processing by using the adaptability calculation result. Therefore, the adaptive retargeting mode can be selected according to the image characteristics and the relationship between the original image and the target equipment, the resolution ratio and the width-to-height ratio of the target can be retargeted to the image under the condition that the key target and a small amount of distortion are kept, and the user experience is improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the original image is analyzed, and the redirectability of the image is evaluated by combining semantic analysis results of texts, faces, human bodies, saliency feature map, object relevance and the like. The fastest method is selected to adapt to the image retargeting processing on the premise of guaranteeing the adaptation quality according to the redirectable objectivity and the interpretable decision condition.

Figure 1:
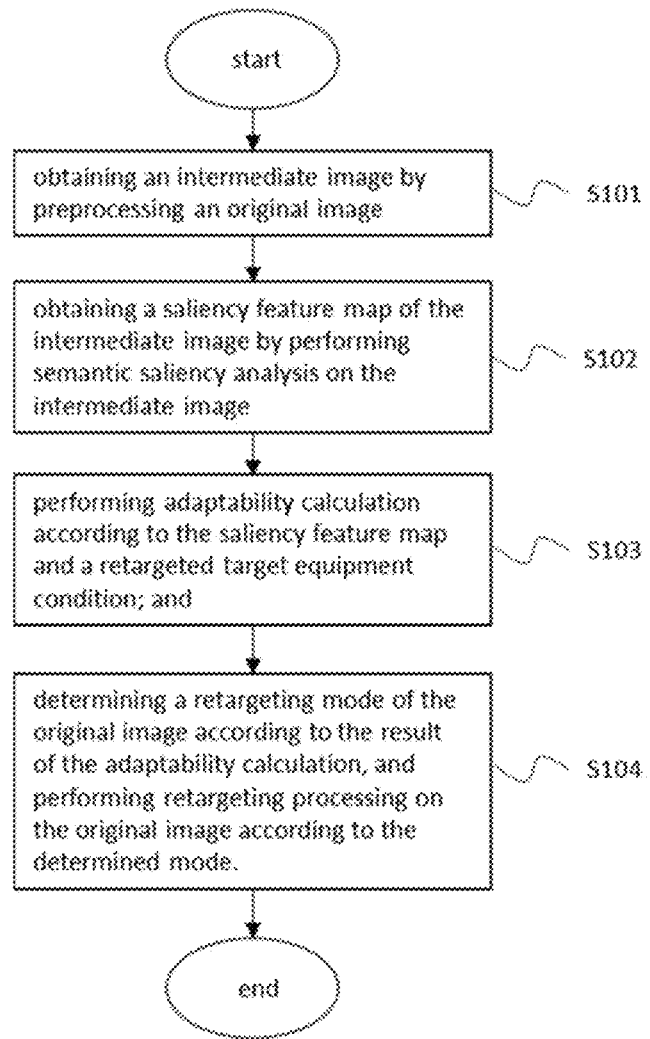
FIG. 1 is a basic flow diagram of a recommendation method according to an embodiment of the disclosure.

FIG. 1 is a schematic diagram of a basic flow of an image retargeting method according to an embodiment of the disclosure.

Referring to FIG. 1, a method includes: operation S101, an original image is preprocessed to obtain an intermediate image.

In consideration of the requirement of fast display adaptation, every time an original image is input, an intermediate object with an appropriate size can be selected and scaled according to the original size and the target size to obtain an intermediate image, wherein the intermediate image is an image obtained through isomorphic processing on the width-to-heights of color, resolution and the like and is used for model processing and feature analysis so as to improve the speed of subsequent semantic analysis. Wherein preprocessing the original picture, including but not limited to picture scaling, brightness adjustment, channel adjustment and the like, to obtain an intermediate image.

Figure 2:
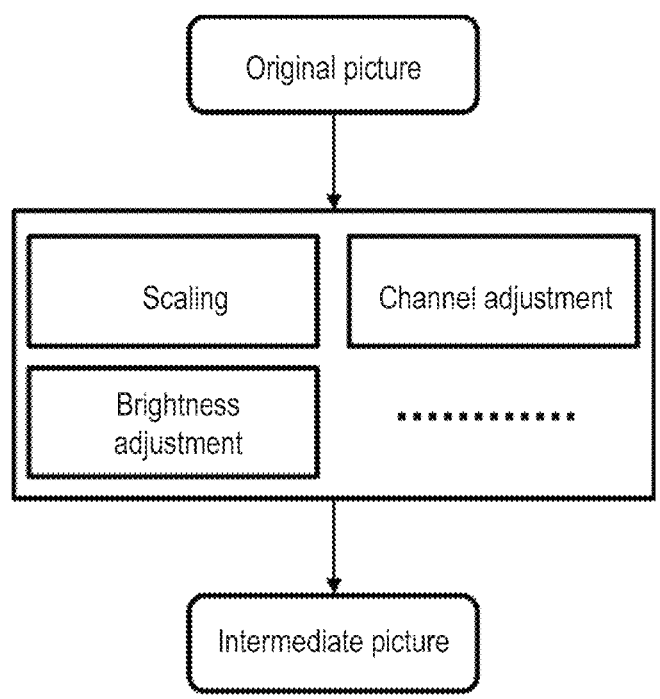
FIG. 2 is a schematic diagram for preprocessing an original image according to an embodiment of the disclosure.

FIG. 2 is a schematic diagram for preprocessing an original image according to an embodiment of the disclosure.

Referring to FIG. 2, at operation S102, semantic saliency analysis is performed on an intermediate image to obtain a saliency feature map of the intermediate image.

Wherein, the semantic saliency analysis comprises, but is not limited to, human face detection, character detection, human body detection, object detection and/or relevance detection and the like, a semantic saliency analysis result is obtained through the saliency analysis, and a saliency feature map is acquired.

Figure 3:
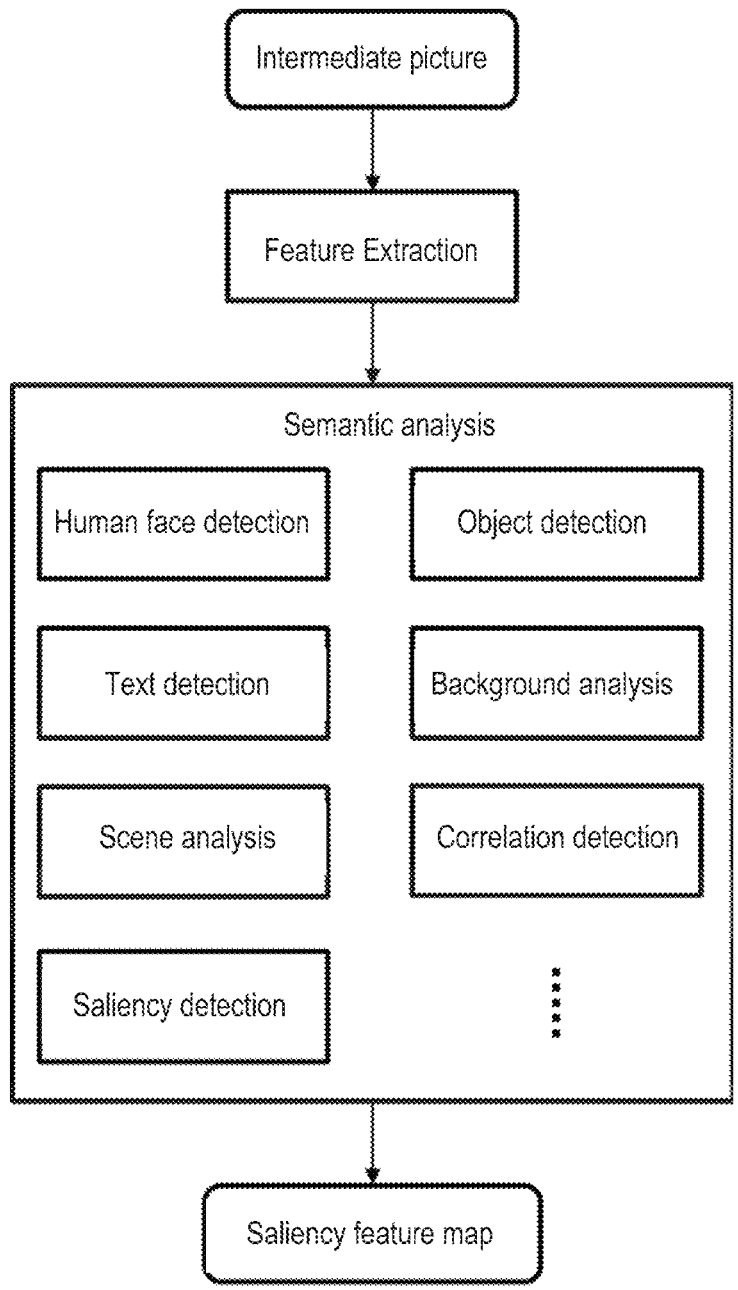
FIG. 3 is a schematic diagram for performing semantic saliency analysis according to an embodiment of the disclosure.

FIG. 3 is a schematic diagram for performing semantic saliency analysis according to an embodiment of the disclosure.

Referring to FIG. 3, at operation 103, adaptability calculation is performed according to a saliency feature map obtained according to operation S102 and a retargeted target equipment condition.

Adaptability calculations in this operation are performed based on the saliency feature map determined in operation S102 and the current conditions of the target equipment being retargeted (e.g., target image shape, resolution, size, etc.). Wherein, adaptable calculations include, but are not limited to, width-to-height ratio matching, saliency calculation, target equipment analysis, visual attention calculation, and/or distortion calculation and the like.

Specifically, when the semantic saliency cannot be detected, the image can be determined to be adaptable; and/or, when the proportion of the original image to the target image is consistent, it can be determined that the image is adaptable; and/or, when the distortion caused by the preset deformation is within an acceptable range, it may also be determined that the image is adaptable. Where it is determined to be adaptable, it may be that the adaptable calculation result is greater than a set threshold value.

Figure 4:
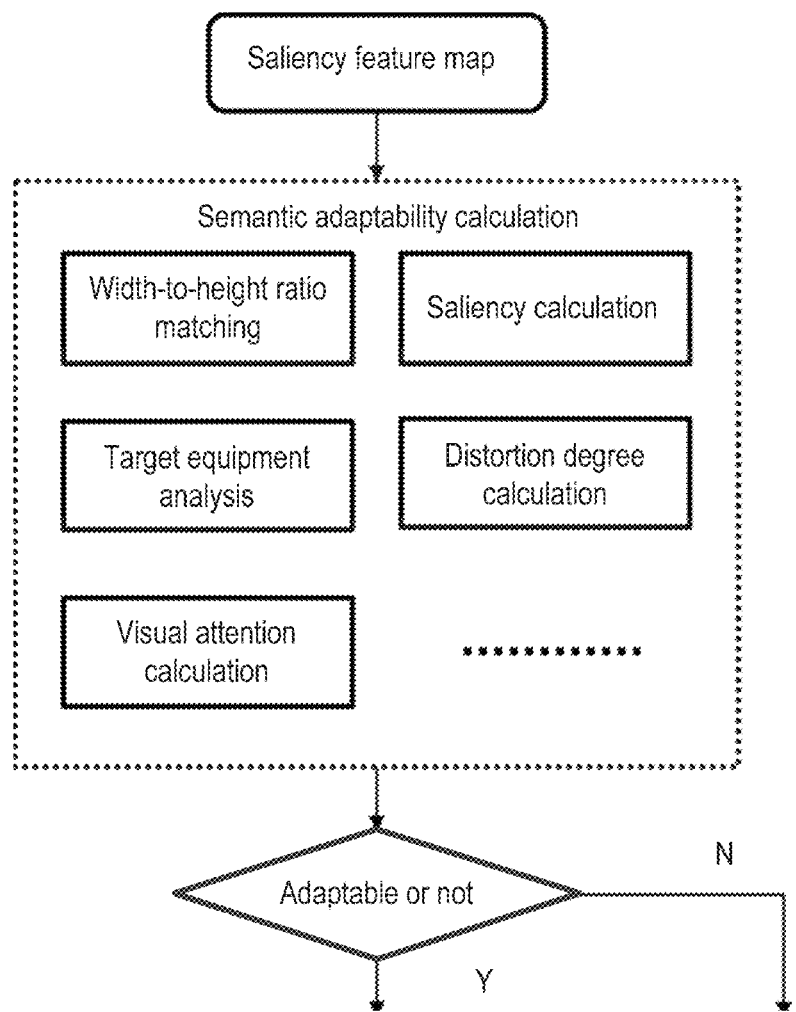
FIG. 4 is a schematic diagram for performing an adaptability calculation according to an embodiment of the disclosure.

FIG. 4 is a schematic diagram for performing an adaptability calculation according to an embodiment of the disclosure.

Referring to FIG. 4, at operation 104, a retargeting mode of the image is determined according to a result of an adaptability calculation.

In the disclosure, the retargeting processing can be performed in different retargeting modes for different images according to the image characteristics thereof and the relationship between the original image and the target equipment. Through the processing of the operations S102 and S103, semantic saliency analysis is performed on the image, and an adaptability calculation result is obtained, wherein the processing can reflect the image effect and the relationship between the original image and the target equipment, so that an appropriate retargeting mode can be selected for the original image on the basis of the results of the operations S102 and S103.

In an implementation, if the adaptability calculation result is that the original image is adaptable, the retargeting processing can be determined by directly adjusting the resolution ratio of the original image; the processing mode is simple and convenient, the image is displayed to be adaptable according to the adaptability calculation result of the original image, that is to say, the quality requirement can be met by adopting a simple retargeting mode, so that the most rapid and convenient mode is selected, and the resolution ratio of the original image is directly adjusted to obtain the target image to be displayed.

In an implementation, if the adaptability calculation result is that the original image is not adaptable, selecting an optimal retargeting mode according to the saliency feature map obtained by the semantic saliency analysis, and the constraint condition determined by the target equipment condition on the basis of a preset neural network model for selecting a retargeting strategy.

Figure 5:
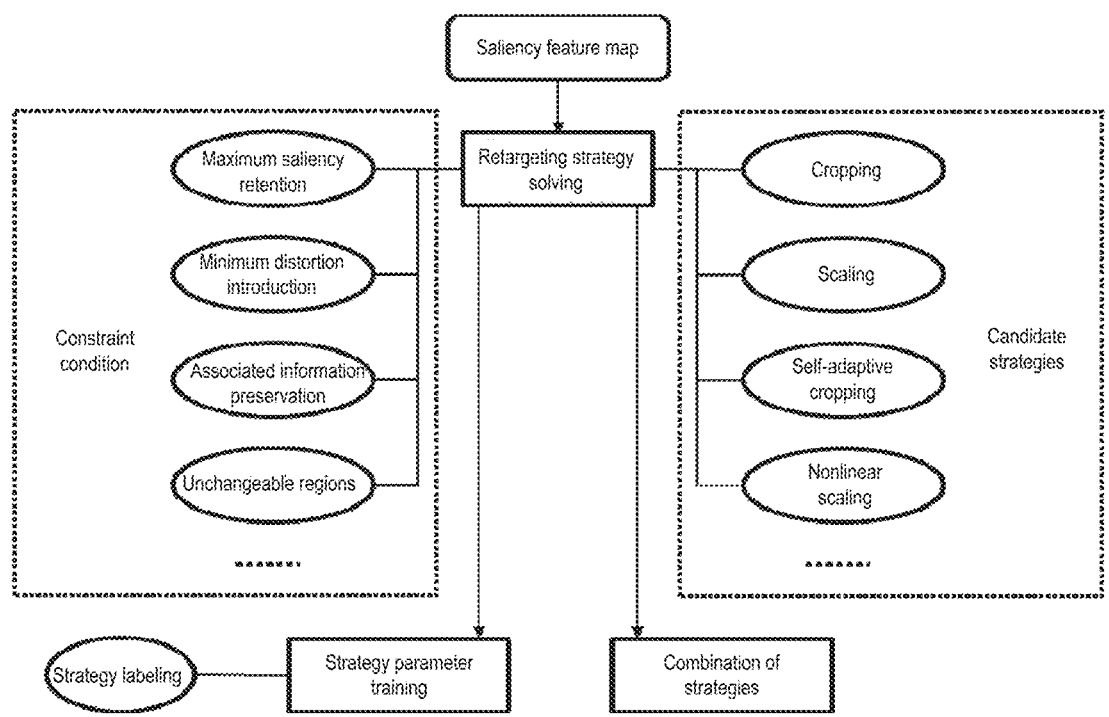
FIG. 5 is a schematic diagram of selecting an optimal retargeting mode when an original image is not adaptable according to an embodiment of the disclosure.

FIG. 5 is a schematic diagram of selecting an optimal retargeting mode when an original image is not adaptable according to an embodiment of the disclosure.

Referring to FIG. 5, in more detail, for non-adaptable images, a retargeting strategy may be solved, the best retargeting scheme selected or combined in conjunction with semantic saliency, including but not limited to methods of scale, crop, seam carving, genetic seam carving (GSC), etc.

In an implementation, the disclosure provides a neural network model for performing retargeting strategy solving. Selecting various typical images, various target equipment conditions and quality requirements as a data set for model training.

Figure 6:
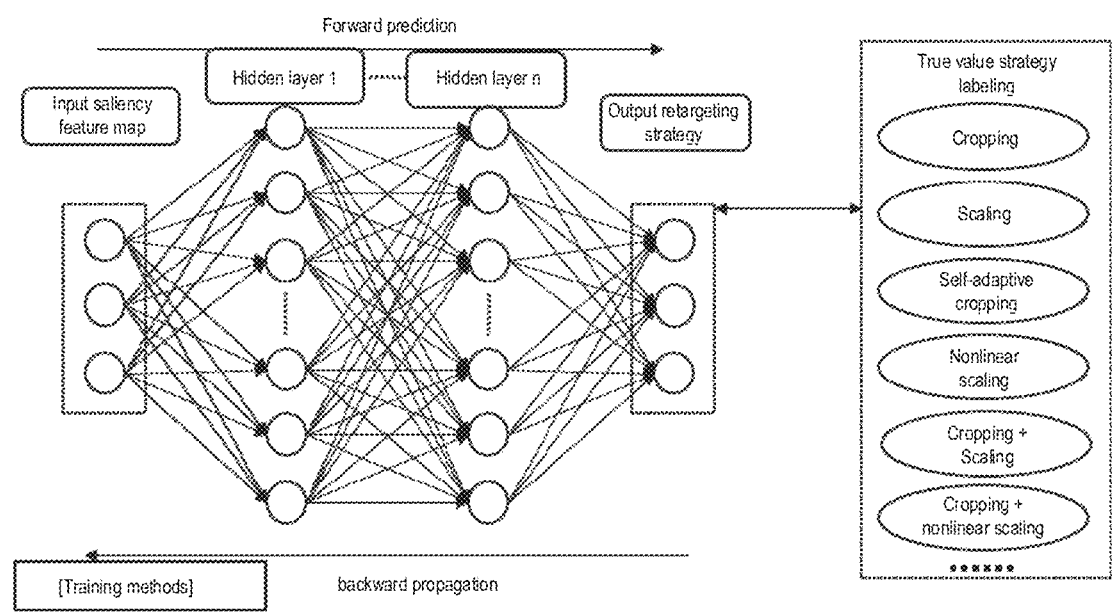
FIG. 6 is a training diagram of a neural network model according to an embodiment of the disclosure.

FIG. 6 is a training diagram of a neural network model according to an embodiment of the disclosure.

Referring to FIG. 6, candidate retargeting strategies (including various retargeting methods and combinations thereof) are implemented on an original image in the process of producing a data set, and corresponding constraint conditions are designed (as shown in FIG. 5, maximum saliency preservation (i.e., maximum preservation of semantic saliency regions), minimum distortion introduction, and associated information preservation, unchangeable regions, etc.) to screen a generated result map, and a best strategy can be screened by the aid of manual screening. The screened optimal strategy is taken as a label corresponding to the original image, the label is input into a neural network model for training, and parameters in the neural network model are optimized to obtain a finally used neural network model. In order to make the parameters have better generalization performance, the original image types used should have better representativeness and diversity when the training data set is selected and labeled.

After obtaining the neural network model, inputting the current original image and constraint conditions determined by semantic saliency analysis results, the current target equipment and the original image, and to obtain an optimal retargeting mode or a combination thereof by using the neural network model. Wherein, the resulting retargeting methods include, but are not limited to, methods of crop, scale, adapted-crop, Non-Linear scale, and the like, and combinations thereof.

Continuing at operation S104, retargeting processing is performed on the original image according to the retargeting mode determined.

At this point, the retargeting method flow in the disclosure ends.

The image retargeting method provided by the disclosure combines semantic analysis results such as characters, human faces and the like to evaluate the adaptability of the picture, and then the quick retargeting method is preferentially selected on the basis of ensuring the retargeting effect according to the adaptability of the picture and interpretable decision conditions. A large number of experiments and researches on visual quality are performed on a data set consisting of 2350 pictures by the applicant, and the results show that the method is superior to the latest image retargeting method at present, and good retargeting effect is guaranteed while a plurality of pictures can be rapidly processed.

In the following, the specific process of the above method is illustrated by taking a specific application scene as an example.

Figure 7:
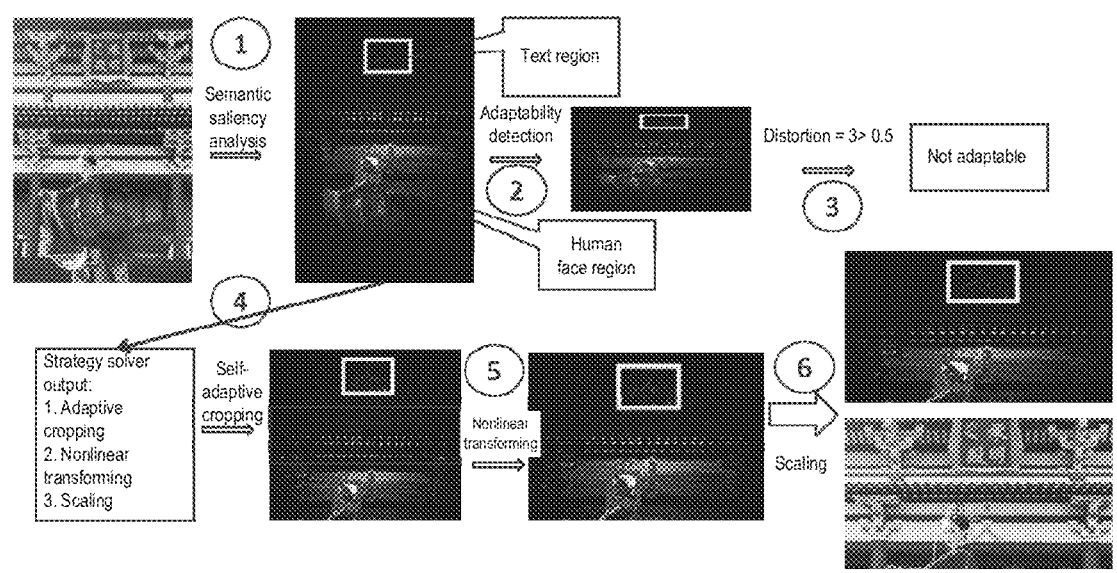
FIG. 7 is an application scene in which an intelligent equipment displays a picture to a user according to a specified size according to an embodiment of the disclosure.

FIG. 7 is an application scene in which an intelligent equipment displays a picture to a user according to a specified size according to an embodiment of the disclosure.

Referring to FIG. 7, the specific process includes following operations:

an intelligent equipment acquires pictures from a service provider;

an intelligent equipment facilitating a service of the disclosure, and inputting pictures and corresponding configuration information;

preprocessing a picture, and adjusting size, color and the like of the picture;

acquiring picture semantic information through methods such as face detection, character detection and the like, and outputting a saliency feature map;

matching a target equipment and a size of a picture, and performing adaptability calculation;

if an adaptability is high, directly adjusting a resolution ratio of an original image and outputting a picture;

if the adaptability is low, performing strategy solving to acquire an optimal strategy combination scheme;

executing an optimal strategy scheme and outputting a picture;

and equipment acquiring a final picture and displaying the final picture to a user.

Figure 8:
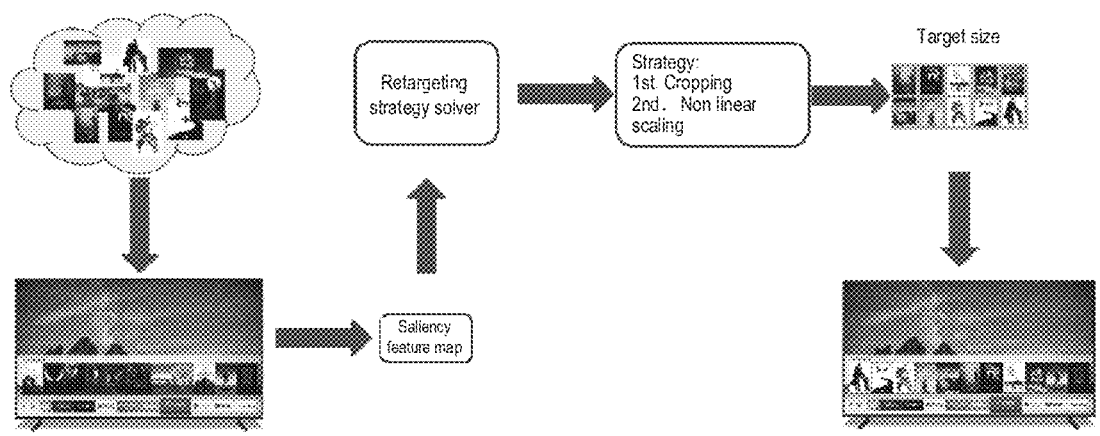
FIG. 8 is a schematic diagram showing program thumbnails on a television using a method according to an embodiment of the disclosure.

FIG. 8 is a schematic diagram showing program thumbnails on a television using a method according to an embodiment of the disclosure.

Referring to FIG. 8, rich multimedia equipment has unique display size and scale requirements, but a resolution scale of a multimedia itself is fixed. Therefore, there is a contradiction between the diversity of picture proportion and the fixity of picture content.

Referring to FIG. 7, when different equipment requests the same picture from a content provider, a picture needs to be properly retargeted, by using a method of the disclosure, a best strategy selection can be quickly and effectively performed, and a picture is retargeted, so that content contained in a picture can be accurately, effectively and comprehensively displayed, and a best viewing experience is provided for a user.

Figure 9:
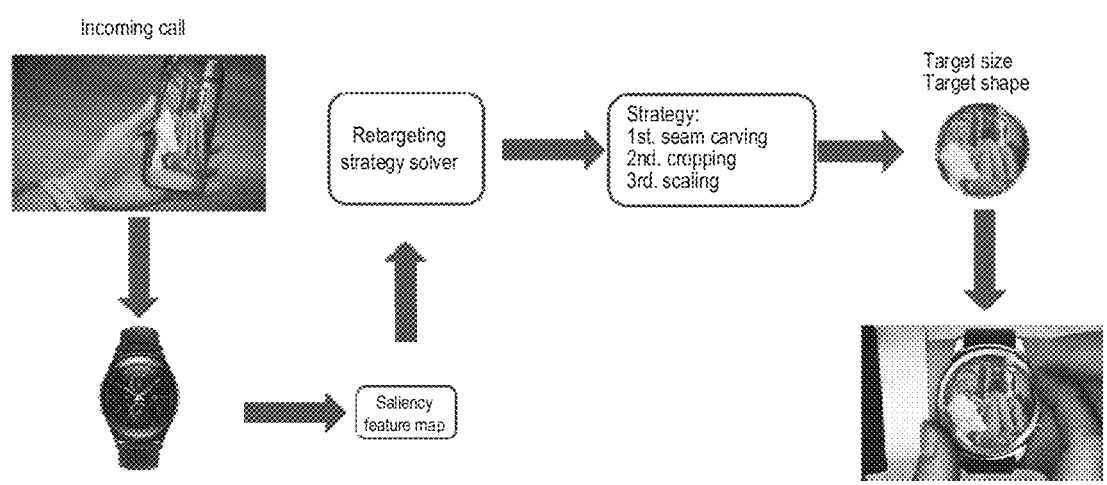
FIG. 9 is a schematic diagram of a thumbnail display on a circular watch using a method according to an embodiment of the disclosure.

FIG. 9 is a schematic diagram of a thumbnail display on a circular watch using a method according to an embodiment of the disclosure.

Referring to FIG. 9, a circular display region easily loses important content information of a picture, and when a watch is used for viewing a picture, displaying icons and displaying thumbnails, how to effectively and comprehensively display a picture is an important problem.

Referring to FIG. 8, with the disclosure, the content of the salient region can be kept as much as possible, the distortion is minimized, and the viewing experience is not influenced.

The above is a specific implementation of the image retargeting method in the disclosure. The disclosure also provides an image retargeting device which can be used for implementing the method of the disclosure.

Figure 10:
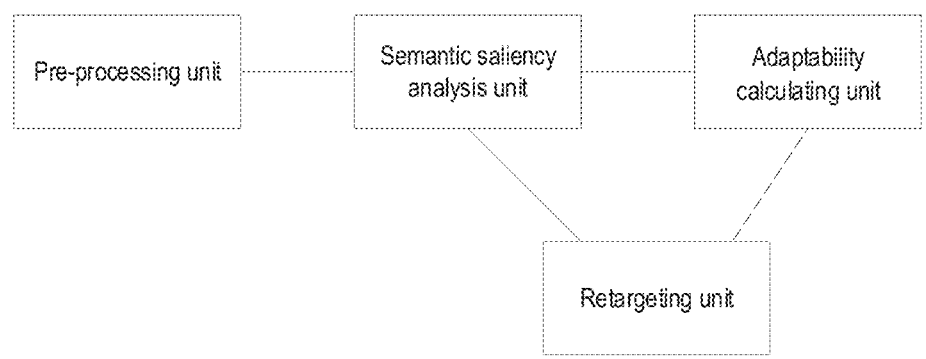
FIG. 10 is a schematic view showing a structure of an image retargeting device according to an embodiment of the disclosure.

FIG. 10 is a schematic view showing the structure of an image retargeting device according to an embodiment of the disclosure.

Referring to FIG. 10, a device includes: a preprocessing unit, a semantic saliency analysis unit, an adaptability calculation unit and a retargeting unit.

Wherein, the preprocessing unit used for preprocessing the original image to obtain an intermediate image. The semantic saliency analysis unit is used for performing semantic saliency analysis on the intermediate image to obtain a saliency feature map of the intermediate image. The adaptability calculation unit is used for performing adaptability calculation according to the saliency feature map and the retargeted target equipment condition. The retargeting unit is used for determining a retargeting mode of the image according to the result of the adaptability calculation, and performing retargeting processing on the original image according to the determined mode.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling an electronic device, the method comprising:
    obtaining an intermediate image by preprocessing an original image;
    obtaining a saliency feature map of the intermediate image by performing semantic saliency analysis on the intermediate image;
    performing an adaptability calculation according to the saliency feature map and a retargeted target equipment condition; and
    determining a retargeting mode of the original image according to a result of the adaptability calculation, and performing retargeting processing on the original image according to the determined mode,
    wherein the performing of the adaptability calculation further comprises, based on proportions of the original image and a target image being consistent, determining that the original image is adaptable.

2. The method of claim 1, wherein the performing of the adaptability calculation according to the saliency feature map and the retargeted target equipment condition comprises:
    based on semantic saliency of the intermediate image being detected, determining that the original image is adaptable; and
    based on a distortion caused by preset deformation being within an acceptable range, determining that the original image is adaptable.

3. The method of claim 1, wherein the determining of the retargeting mode of the original image according to the result of the adaptability calculation comprises at least one of:
    based on the adaptability calculation result indicating that the original image is adaptable, determining to perform retargeting processing by directly adjusting a resolution ratio of the original image; or
    based on the adaptability calculation result indicating that the original image is not adaptable, selecting the retargeting mode according to the saliency feature map obtained by the semantic saliency analysis, a constraint condition determined by the retargeted equipment condition and a preset neural network model for selecting a retargeting strategy.

4. The method of claim 1, wherein the semantic saliency analysis comprises at least one of: a human face detection, a character detection, a human body detection, an object detection or a relevance detection.

5. The method of claim 1, wherein the adaptability calculation comprises at least one of: a width-to-height ratio matching, a saliency calculation, a target equipment analysis, a visual attention calculation or a distortion calculation.

6. The method of claim 1, wherein the obtaining the intermediate image by preprocessing the original image comprises performing isomorphic processing based on a color and a resolution of the original image.

7. An electronic device comprising:
    a memory; and
    a processor comprising a preprocessing circuitry, a semantic saliency analysis circuitry, an adaptability calculation circuitry and a retargeting circuitry,
    wherein the processor configured to:
        obtain, through the preprocessing circuitry, an intermediate image by preprocessing an original image,
        obtain, through the semantic saliency analysis circuitry, a saliency feature map of the intermediate image by performing semantic saliency analysis on the intermediate image,
        perform, through the adaptability calculation circuitry, an adaptability calculation according to the saliency feature map and a retargeted target equipment condition, and
        determine, through the retargeting circuitry, a retargeting mode of the original image according to a result of the adaptability calculation, and perform retargeting processing on the original image according to the determined mode,
    wherein the adaptability calculation circuitry is further configured to, based on proportions of the original image and a target image being consistent, determine that the original image is adaptable.

8. The electronic device of claim 7, wherein the adaptability calculation circuitry is further configured to:
    based on semantic saliency of the intermediate image being detected, determine that the original image adaptable; and
    based on a distortion caused by preset deformation being within an acceptable range, determine that the original image is adaptable.

9. The electronic device of claim 7, wherein the retargeting circuitry is further configured to:
    based on the adaptability calculation result indicating that the original image is adaptable, determine to perform retargeting processing by directly adjusting a resolution ratio of the original image; and
    based on the adaptability calculation result indicating that the original image is not adaptable, select the retargeting mode according to the saliency feature map obtained by the semantic saliency analysis, a constraint condition determined by the retargeted equipment condition and a preset neural network model for selecting a retargeting strategy.

10. The electronic device of claim 7, wherein the semantic saliency analysis comprises at least one of: a human face detection, a character detection, a human body detection, an object detection or a relevance detection.

11. The electronic device of claim 7, wherein the adaptability calculation comprises at least one of: a width-to-height ratio matching, a saliency calculation, a target equipment analysis, a visual attention calculation or a distortion calculation.

12. The electronic device of claim 7, wherein the preprocessing circuitry is further configured to obtain the intermediate image by performing isomorphic processing based on a color and a resolution of the original image.

13. The electronic device of claim 7, wherein the adaptability calculation result indicates that the original image is adaptable based on the adaptability calculation result being greater than a set threshold.

14. The electronic device of claim 9, wherein the constraint condition comprises at least one of minimum distortion introduction, associated information preservation, or an unchangeable region.

* * * * *